US009661497B2

(12) United States Patent
Henry et al.

(10) Patent No.: US 9,661,497 B2
(45) Date of Patent: May 23, 2017

(54) CONTROL AND ENHANCEMENT OF DIRECT WIRELESS SERVICE COMMUNICATIONS

(71) Applicant: Cisco Technology, Inc., San Jose, CA (US)

(72) Inventors: Jerome Henry, Pittsboro, NC (US); Andrew Myles, Turramurra (AU); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 14/471,332

(22) Filed: Aug. 28, 2014

(65) Prior Publication Data

US 2016/0066181 A1    Mar. 3, 2016

(51) Int. Cl.
| | |
|---|---|
| *H04W 12/06* | (2009.01) |
| *H04W 76/02* | (2009.01) |
| *H04W 12/08* | (2009.01) |
| *H04L 29/06* | (2006.01) |
| *H04W 4/00* | (2009.01) |
| *H04L 9/32* | (2006.01) |
| *H04W 84/12* | (2009.01) |
| *H04W 4/02* | (2009.01) |

(52) U.S. Cl.
CPC .......... *H04W 12/06* (2013.01); *H04L 63/083* (2013.01); *H04L 63/0807* (2013.01); *H04L 63/0823* (2013.01); *H04L 63/1483* (2013.01); *H04W 4/001* (2013.01); *H04W 12/08* (2013.01); *H04W 76/023* (2013.01); *H04L 9/3263* (2013.01); *H04W 4/021* (2013.01); *H04W 84/12* (2013.01)

(58) Field of Classification Search
CPC ............. H04L 63/0807; H04L 63/0823; H04L 63/083; H04L 9/3226; H04L 9/3263; H04L 67/20; H04W 12/06; H04W 12/08
USPC ............................................................ 726/5
See application file for complete search history.

(56) References Cited

U.S. PATENT DOCUMENTS

| | | | |
|---|---|---|---|
| 7,346,338 B1 | 3/2008 | Calhoun et al. | |
| 7,370,362 B2 * | 5/2008 | Olson | ................. H04L 63/1433 726/25 |
| 7,453,840 B1 | 11/2008 | Dietrich et al. | |
| 7,483,984 B1 * | 1/2009 | Jonker | .................... H04L 41/22 709/203 |
| 7,558,960 B2 * | 7/2009 | Cam Winget | ........... H04L 63/08 713/160 |

(Continued)

*Primary Examiner* — Hadi Armouche
*Assistant Examiner* — Shahriar Zarrineh
(74) *Attorney, Agent, or Firm* — Edell, Shapiro & Finnan, LLC

(57) ABSTRACT

An access point is configured to control peer-to-peer wireless transmission in an area around the access point. The access point receives a message from a service providing device advertising a service. The access point receives another message from a service using device requesting the service. The access point determines whether the service using device or the service is prohibited in the area controlled by the access point. Responsive to a determination that the service using device is prohibited, the access point blocks the service using device from receiving the service. Responsive to a determination that the service is prohibited, the access point blocks the service providing device from providing the service.

15 Claims, 10 Drawing Sheets

(56) References Cited

U.S. PATENT DOCUMENTS

| | | | | |
|---|---|---|---|---|
| 8,018,883 B2* | 9/2011 | Bowser | H04L 63/1441 | 370/310.1 |
| 8,279,880 B2* | 10/2012 | Allard-Jacquin | H04W 92/02 | 340/539.12 |
| 8,713,626 B2* | 4/2014 | Cam-Winget | H04L 63/08 | 726/1 |
| 2003/0112789 A1* | 6/2003 | Heinonen | H04W 28/16 | 370/349 |
| 2005/0259611 A1* | 11/2005 | Bhagwat | H04L 12/2602 | 370/328 |
| 2007/0266236 A1* | 11/2007 | Colditz | H04L 63/0428 | 713/153 |
| 2008/0240016 A1* | 10/2008 | Cai | H04W 4/02 | 370/328 |
| 2009/0016529 A1* | 1/2009 | Gopinath | H04L 63/1416 | 380/270 |
| 2009/0029691 A1* | 1/2009 | Shen | H04W 76/02 | 455/418 |
| 2010/0067504 A1* | 3/2010 | Chen | H04L 63/1408 | 370/338 |
| 2010/0070760 A1* | 3/2010 | Vanderveen | H04L 63/0823 | 713/156 |
| 2010/0088732 A1* | 4/2010 | Park | H04L 12/2809 | 725/78 |
| 2010/0228859 A1* | 9/2010 | Backstrom | H04W 48/04 | 709/225 |
| 2011/0047030 A1* | 2/2011 | Yoon | G06Q 30/02 | 705/14.64 |
| 2011/0321126 A1* | 12/2011 | Maniatopoulos | H04W 12/06 | 726/3 |
| 2012/0114057 A1* | 5/2012 | Nakatake | H04B 17/23 | 375/267 |
| 2012/0202469 A1* | 8/2012 | Abhari | G06Q 30/0241 | 455/414.1 |
| 2012/0314571 A1* | 12/2012 | Forssell | H04W 12/08 | 370/230 |
| 2012/0316940 A1* | 12/2012 | Moshfeghi | G06Q 30/02 | 705/14.16 |
| 2013/0024883 A1* | 1/2013 | Elmaleh | H04N 21/4126 | 725/25 |
| 2013/0036010 A1* | 2/2013 | Stewart | H04L 29/06 | 705/14.53 |
| 2013/0238759 A1* | 9/2013 | Ostrowski | H04L 67/2814 | 709/219 |
| 2013/0308618 A1* | 11/2013 | Panneerselvam | G01S 5/0236 | 370/338 |
| 2013/0317892 A1* | 11/2013 | Heerboth | H04W 88/08 | 705/14.4 |
| 2013/0343364 A1* | 12/2013 | Fuller | H04W 4/02 | 370/338 |
| 2014/0010150 A1* | 1/2014 | Agarwal | H04W 4/02 | 370/328 |
| 2014/0269370 A1* | 9/2014 | Dharanipragada | H04W 24/02 | 370/252 |
| 2014/0286321 A1* | 9/2014 | Balian | H04W 12/06 | 370/338 |
| 2015/0012971 A1* | 1/2015 | Ram | H04W 12/08 | 726/3 |

* cited by examiner

CONTROL AND ENHANCEMENT OF DIRECT WIRELESS SERVICE COMMUNICATIONS

TECHNICAL FIELD

The present disclosure relates to providing third party services to wireless devices and their users.

BACKGROUND

Peer to Peer (P2P) wireless connections, such as Wi-Fi® Direct, allow two devices to communicate with each other without requiring coordination or even existence of a wireless network infrastructure. In some networks, this type of P2P communication may be a security hazard. One of the peer devices may be a valid client on a wireless infrastructure network, and may be configured as a packet forwarder (e.g., bridge or router). The Wi-Fi Direct specification refers to packet forwarding between the Wi-Fi Direct connection and the wireless infrastructure as a "cross connection." The Wi-Fi Direct specification includes a mechanism by which the wireless infrastructure may forbid cross connection, but strict implementation of this feature is not predictable. For example, the peer device may alternate between a secure infrastructure connection and a P2P connection, fully compliant with a restriction on the cross connection feature, while still functionally allowing packet forwarding.

DESCRIPTION OF EXAMPLE EMBODIMENTS

Overview

The techniques presented herein provide for a method for an access point to control peer-to-peer wireless transmission in an area around the access point. The access point receives a first message from a first device advertising a service. The access point receives a second message from a second device requesting the service. The access point determines whether the second device or the service is prohibited in an area controlled by the access point. Responsive to a determination that the second device is prohibited, the access point blocks the second device from receiving the service. Responsive to a determination that the service is prohibited, the access point blocks the first device from providing the service.

Example Embodiments

In some networks with high security and strict monitoring requirements (e.g., banks, government offices, etc.) direct communication to and from devices may not be allowed. The network administrators may want to block all wireless communications that do not traverse the infrastructure for monitoring and control. Uncontrolled wireless communication may use bandwidth that is otherwise allocated for an access point and its clients' communications. Additionally, direct communication between corporate and non-corporate devices may be blocked for security purposes.

In other networks, uncontrolled direct communication between devices may not be efficient. For example, in public conference facilities, one Bring Your Own Device (BYOD) may need to display/share content across several screens at the same time, sometimes in different rooms. In larger conference facilities, the display device may not be physically close enough to the presenting client device to ensure a consistent direct connection. In another example, in a classroom environment, the instructor may be allowed to project their BYOD screen to a display device, but students with the same type of BYOD may not be allowed to display content on that device.

The solutions presented herein allow a network administrator to control wireless P2P communication in environments that may require strict control. In one example, the P2P communication is controlled through containment (e.g., forcing P2P communication attempts to fail). In another example, the P2P communication is controlled through cooperation (e.g., relaying/forwarding traffic through the wireless infrastructure, where Quality of Service (QoS), security, and range policies may be applied).

Figure 1:
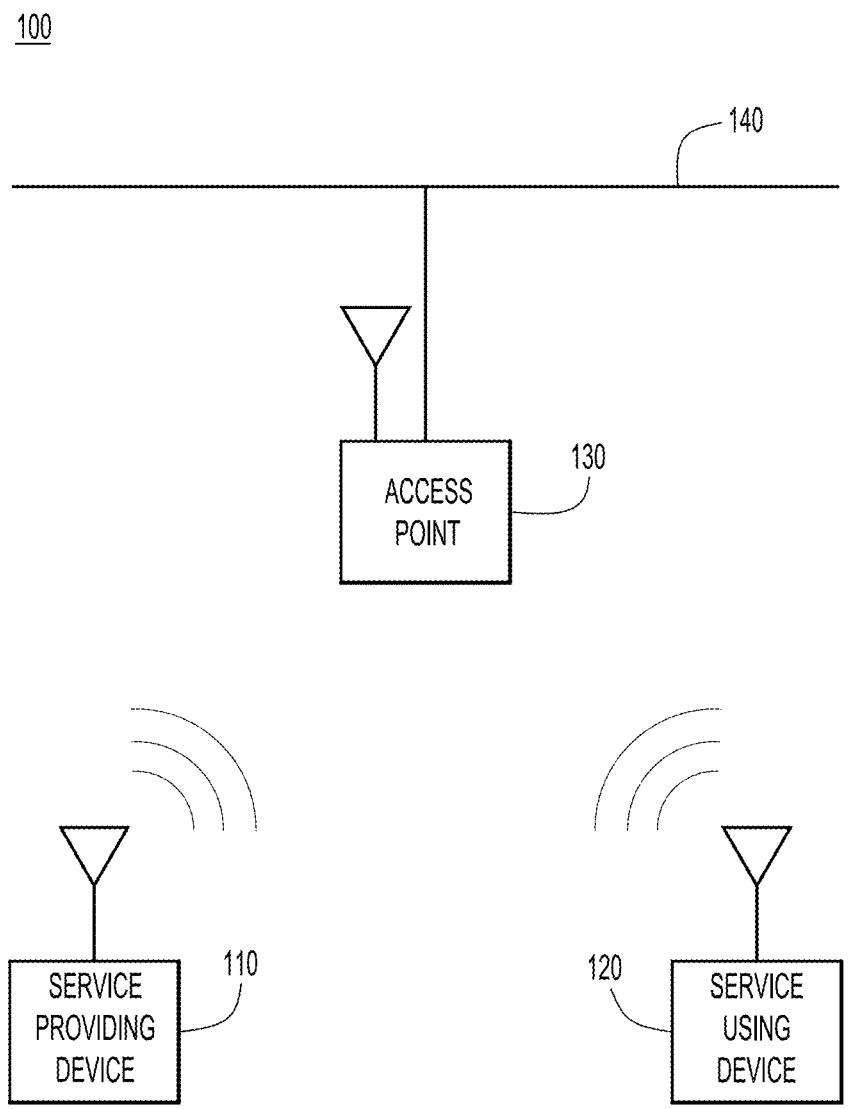
FIG. 1 is a block diagram of a system of a wireless network access point configured to control and enhancing services between two wireless devices according to an example embodiment.

Referring to FIG. 1, a system 100 is shown comprising a service providing device 110 that wirelessly advertises a service, a service using device 120 that is able to use the service, and a wireless access point 130 that is configured to provide access to an infrastructure connection to network 140. In general, the service providing device 110 advertises a service that the service using device 120 accepts in order to create a direct, peer-to-peer wireless link between the two devices.

In one example, a service providing device 110 may be an accessory to a computing device, such as a user input device (e.g., keyboard, mouse, etc.), a user output device (e.g., video monitor, audio speakers, printer, etc.), or a data input/output device (e.g., external disk drive, optical disc player/recorder, etc.). In this example, the service using device 120 may be the computing device (e.g., desktop computer, laptop computer, mobile/cellular phone, tablet computer, etc.) that uses the accessory. In other words, the service providing device 110 is a wirelessly enabled monitor that may advertise its functions as a service, and the service using device 120 is a computer that accepts the advertised service as a way of connecting the computer to a monitor. Alternatively, the roles of advertising the service and accepting the service may be reversed, and the service providing device 110 is a computer that may advertise its output of video data as a service, and the service using device 120 is a monitor that accepts the service to display the video data.

Wireless access point 130 provides wireless access to a wired network infrastructure 140. In one example, the wired network infrastructure ("network") 140 may include or connect to further networks, e.g., any combination of Internet, intranet, local area networks (LANs), and/or wide area networks (WANs). In another example, multiple access points may be used to provide wireless access to the network 140.

Figure 2:
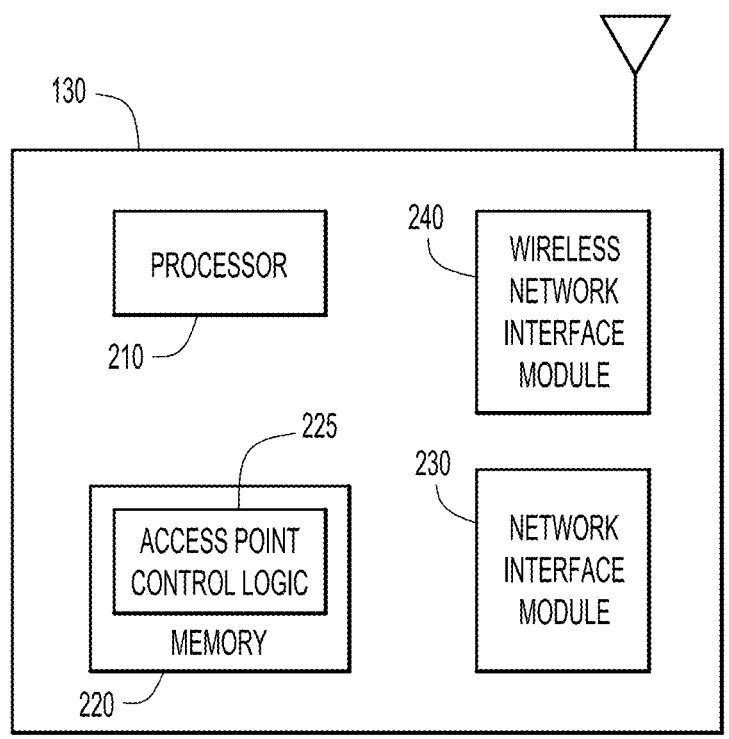
FIG. 2 is a block diagram of an access point configured to control P2P wireless connections according to an example embodiment.

Referring now to FIG. 2, a simplified block diagram is shown of an access point 130 configured to augment and control services according to the techniques presented herein. Access point 130 includes, among other possible components, a processor 210 to process instructions relevant to control a service, and a memory 220 to store a variety of data and software instructions (e.g., access point control logic 225). The access point 130 includes a network interface module 230 to communicate with network 140. The access point 130 also includes a wireless network interface module 240 to communicate with service providing device 110 and service using device 120, such as in accordance with a Wi-Fi certified implementation of the 802.11 communication standard. In one example, portions of network interface module 230 may also be used in wireless network interface module 240 to perform network operations common to wired and wireless networks.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

The access point 130 may block wireless P2P connections within its range by confusing one or both of the devices 110 and 120 with ambiguous or contradictory messages. After the access point 130 detects a P2P initiation frame (e.g., probe response, beacon, etc.) from the service providing device 110, the access point 130 may replay the frame using the media access control (MAC) address of the service providing device 110, but with a setting that is not allowed by a standard. For example, the access point 130 may replay a Wi-Fi Direct frame, but in such a manner so as to only describe 802.11b rates in the supported rates frames capability fields. Per the P2P v.1.2 specification, a Wi-Fi Direct connection cannot communicate at 802.11b rates and should not mention any 802.11b rate in their capability fields. Because the access point 130 spoofs the MAC address of the service providing device 110, the service using device 120 should refuse to pair with the offending MAC address, even if the service providing device 110 keeps sending valid information in its capabilities field.

Similarly, the access point may replay the initiation frame sent by device 110, but with an invalid P2P Information Element (IE) field (e.g., incorrect version number, incorrect Wi-Fi Alliance (WFA) organizationally unique identifier (OUI)), or an invalid P2P capability attribute value (e.g., P2P device discovery set to "unsupported," P2P device limit set to 1, P2P Group Owner (GO) set to 0, P2P group limit set to 1, group formation set to 1 with GO set to 0). Any of these techniques create ambiguity and therefore unreliability, such that a Wi-Fi Direct connection cannot be formed with a high degree of confidence.

Alternatively, the access point 130 may inhibit wireless P2P connections with classical, i.e., non-ambiguous, legitimate, frames to force the P2P connection to fail. Using Wi-Fi Direct as an example, devices 110 and 120 discover each other through probe requests and responses. A Wi-Fi Direct GO may also send beacons. An access point 130 may block Wi-Fi Direct communication by spoofing the MAC address of the device 110 (acting as a GO), and sending a de-authentication or disassociation frame to each Wi-Fi Direct client, e.g., device 120, performing an authentication or association request. In an example in which the access point 130 begins inhibiting the P2P connection during the initial connection establishment phase, the access point 130 may also use an "authentication rejected" frame. In another example, the access point 130 may spoof the GO MAC address and reply with a group limit set to 1, marking that the GO does not accept any additional connections. In yet another example, the access point 130 may respond with a GO Negotiation Response frame that includes the Status attribute with the Status Code field set to "Fail; unable to accommodate request." In still a further example, the access point 130 may cause the connection to fail by sending an Extensible Authentication Protocol (EAP) Failure message during the connection setup.

In one example, upon detecting service providing device 110 trying to connect with service using device 120 by announcing itself as a registrar in active Push Button Connection (PBC) mode, the access point 130 may send a frame also announcing the access point 130 as a registrar in active PBC mode. In this example, the access point 130 does not need to spoof the MAC address of the service providing device 110, because the service using device 120 should abort the connection when detecting more than one registrar in active PBC mode. Similarly, upon detecting the service using device 120 trying to connect with the service providing device 110 by announcing itself as an enrollee in active PBC mode, the access point 130 may send a frame also announcing the access point 130 as an enrollee in active PBC mode.

In another example, the access point 130 may force service providing device 110 and service using device 120 to communicate through the access point infrastructure. This allows the infrastructure connected through network 140 to better manage communications control, granular quality of service (QoS), or extend the range of the P2P communication. A network administrator may, in advance, select specific devices and/or services that should be forced to communicate through the infrastructure. Additionally, the system administrator may select devices and/or services that should be ignored (i.e., allowed to communicate via direct P2P), or completely blocked. This selection may be done on the access point 130 or other infrastructure by listing the known device types and/or service types listed by the WFA P2P specification.

When service providing device 110 announces its service (e.g., via probe responses or beacons), the access point 130 may identify and list the device and/or the service. Devices and services may be categorized based on the system administrator's choice to let the P2P connection occur for one category, to force the P2P connection through the infrastructure for another category, or to block the P2P for yet another category. Similarly, when service using device 120 is detected by the access point 130 as entering the scan or discovery phase, the service using device 120 may be matched against the configured categories for device types. The access point 130 may then use blocking techniques as described above for devices and/or services belonging to a category that is listed to be blocked. The access point 130 may allow the P2P connection to continue for devices and/or services belonging to a category that is listed to be ignored. The access point 130 may also redirect the P2P connection through the network infrastructure for devices and/or services belonging to a category that is listed to be redirected.

Figure 3:
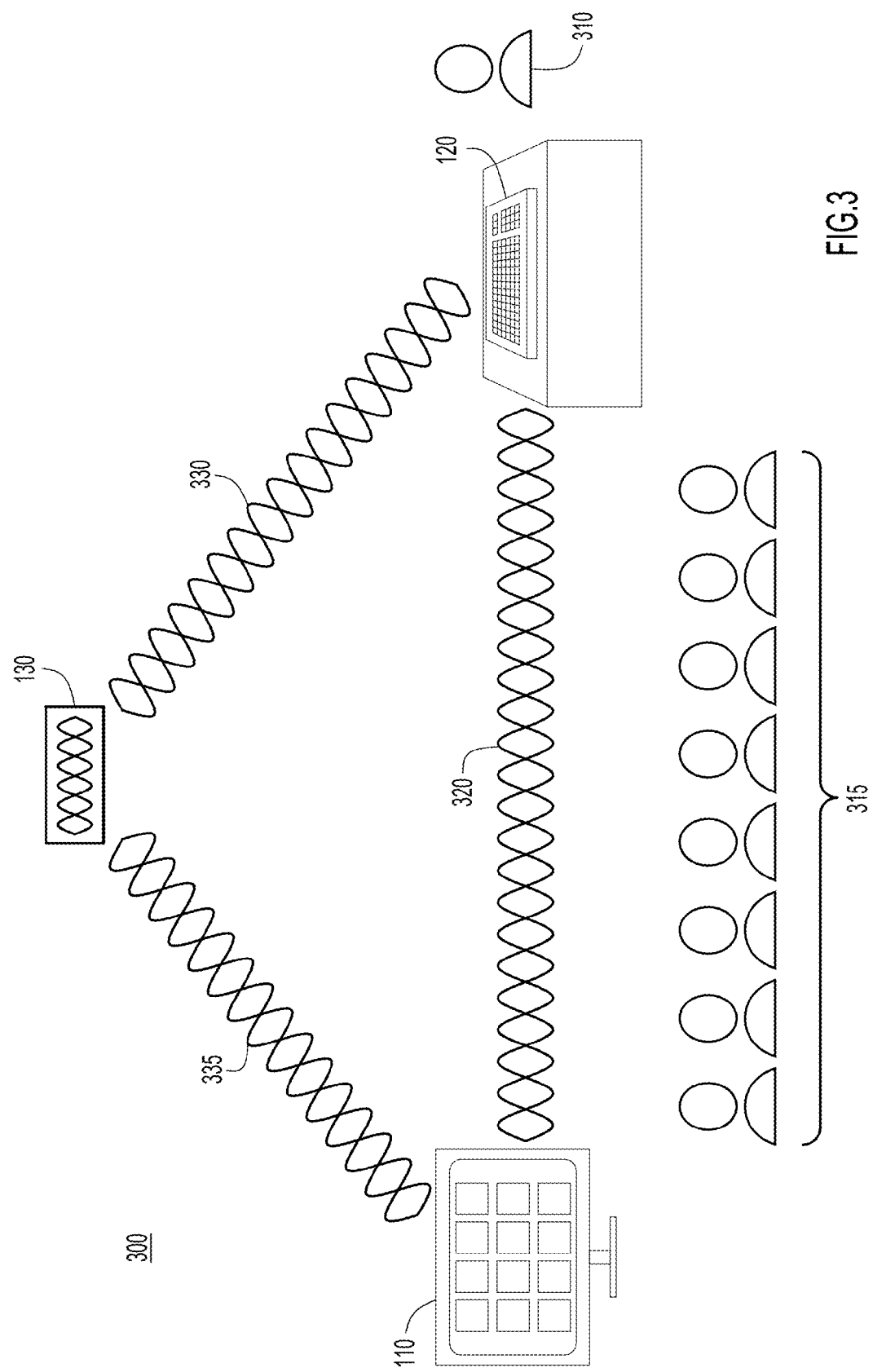
FIGS. 3-5 are simplified block diagrams of at least one access point enhancing a presentation service according to an example embodiment.

Referring now to FIG. 3, an example is shown of a system 300 that uses an access point to extend the range of a P2P connection in a conference room environment. In this example, a presenter 310 displays a presentation to audience 315. The presentation is stored on device 120 (e.g., a laptop computer), and is displayed on device 110. Initially, device 120 may attempt to make a direct P2P connection to device 110 through path 320. However, in some circumstances, such as a presenter in the rear of a large conference room, the path 320 may be unreliable and a direct P2P connection between device 120 and device 110 may be unlikely or even impossible to maintain.

Access point 130 assists the P2P connection by relaying the messages in the P2P connection as an intermediary. Path 330, between the device 120 and the access point 130, and path 335, between the access point 130 and device 110, can each be shorter and more reliable than the longer, direct path 320. Additionally, the access point 130 may be positioned (e.g., on the ceiling of the conference room) such that paths 330 and 335 avoid potential interference that may be present in path 320 traversing closer to the audience 315. In one example, the access point may discourage any attempt to form a direct connection along path 320, since that path may become unreliable, leading to a poor user experience.

Figure 4:
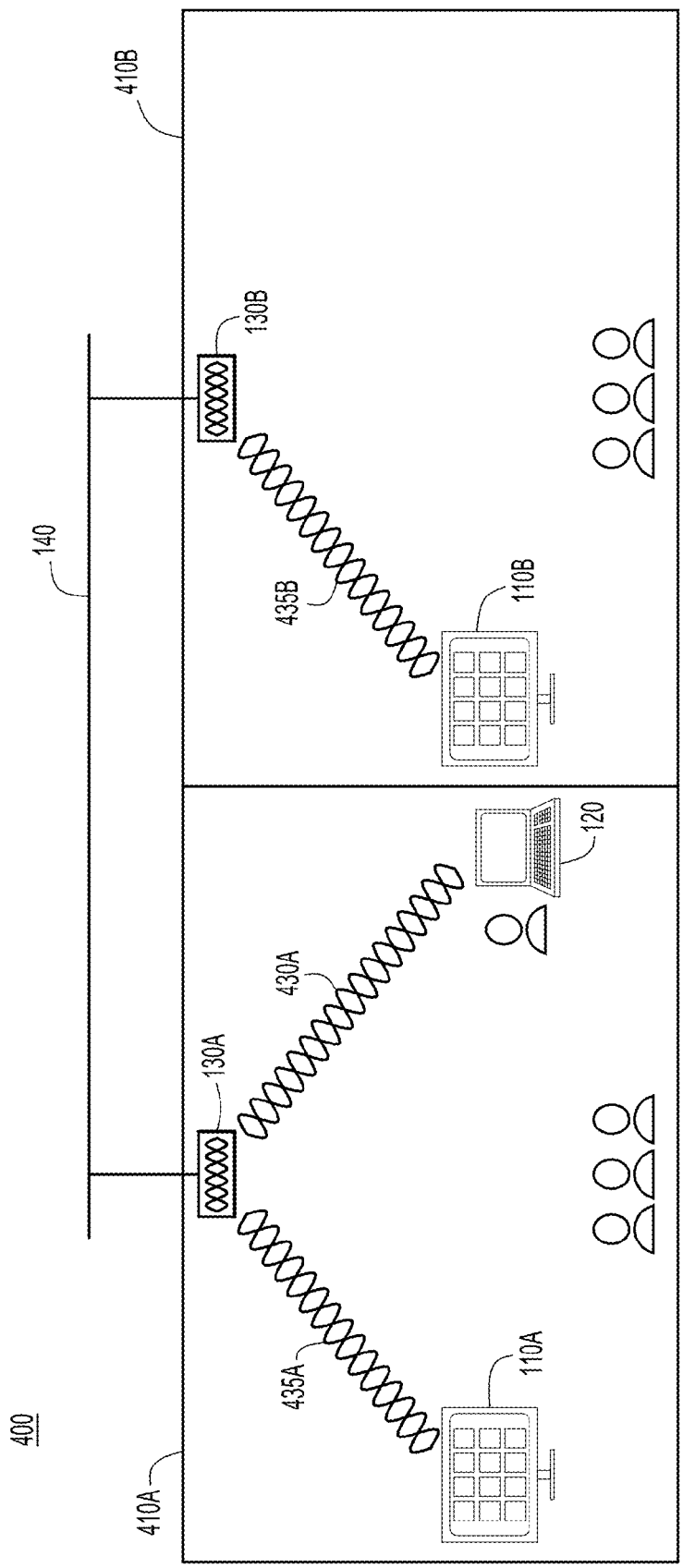

Referring now to FIG. 4, an example is shown of a system 400 that uses access points to multicast a presentation seamlessly to audiences in different rooms through multiple displays. In this example, two rooms 410A and 410B are serviced by access point 130A and 130B, respectively. Rooms 410A and 410B have a display 110A and 110B, respectively, to display a presentation to the audience in each room. To provide the data for the presentation, the device 120 of the presenter may attempt to pair with a display device through access point 130A, as shown at path 430A. The access point 130A relays the display data along path 435A to display device 110A, allowing device 110A to display the presentation to the audience in room 410A. The access point 130A also forwards the display data along network 140 to access point 130B. The access point 130B relays the display data along path 435B to display device 110B, allowing device 110B to display the presentation to the audience in room 410B. In one example, the decision to forward display data from access point 130A to access point 130B may be set before the device 120 connects to the access point 130A. Alternatively, the presenter may select specific access points (and specific displays in specific conference rooms) to forward the presentation data. In one example, the presenter selects the displays as part of the initial P2P negotiation.

Figure 5:
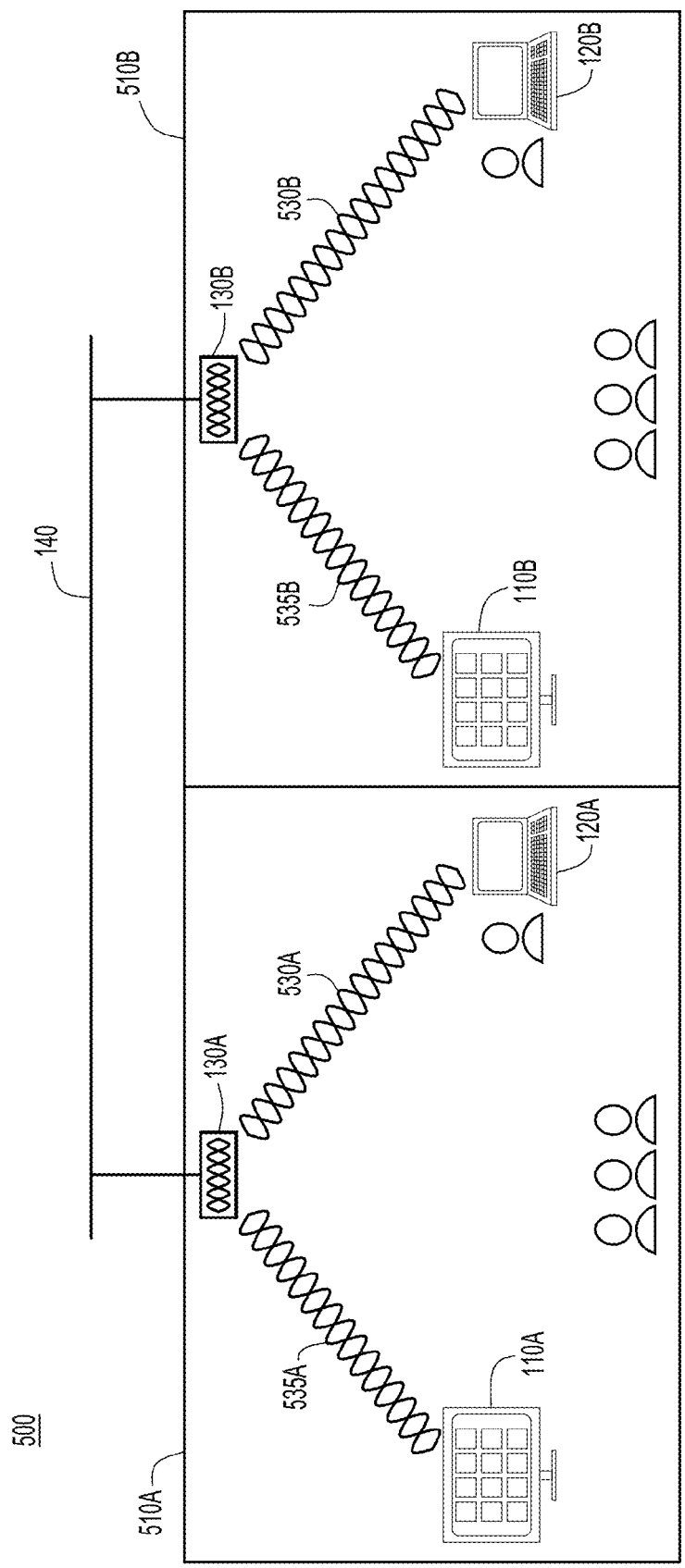

Referring now to FIG. 5, an example is shown of a system 500 that uses access points to allow presenters in different rooms to connect to appropriate display devices. In this example, two rooms 510A and 510B are serviced by access points 130A and 130B, respectively. Rooms 510A and 510B have a display device 110A and 110B respectively, to display a presentation to the audience in each room. Each room has a different presenter that wants to display data on the display in their respective room. In an example in which the rooms 510A and 510B are adjacent, device 120A of a presenter in room 510A may be physically closer to display device 110B in room 510B than it is to display device 110A in room 510A. However, since the presenter wants to display the presentation in the same room that he or she is in, the access points in each room regulate any P2P connections that are attempted in the conference rooms.

In this example, the device 120A, serving as a presenter device, searches for a device offering a display service. The access point 130A advertises those services which are available from room 510A, including the display service available from display device 110A. The access point 130A also attempts to restrict the presenter device 120A from connecting directly with display device 110B in room 510B. The presenter device 120A is then able to connect to the display device 110A through access point 130A via paths 530A and 530B. Similarly, the presenter device 120B in room 510B is able to connect to the display 110B through access point 130B via paths 530B and 535B.

In one example, display devices 110A and 110B may be configured to advertise their P2P services through a manufacturer directed name, such as "LG1234," and the actual display may not be immediately apparent to a presenter in the room. Since displays in adjacent rooms may advertise using the same or similar names, the access points 130A and 130B provide P2P advertisement messages that offer names that a presenter can recognize as the appropriate display. In one example, the access point 130A may advertise the display service of display device 110A by referring to the room number of room 510A, that the presenter would presumably recognize. This allows the presenter to have some assurance that the display that the presenter's device is sending the presentation data to is the appropriate display.

Figure 6:
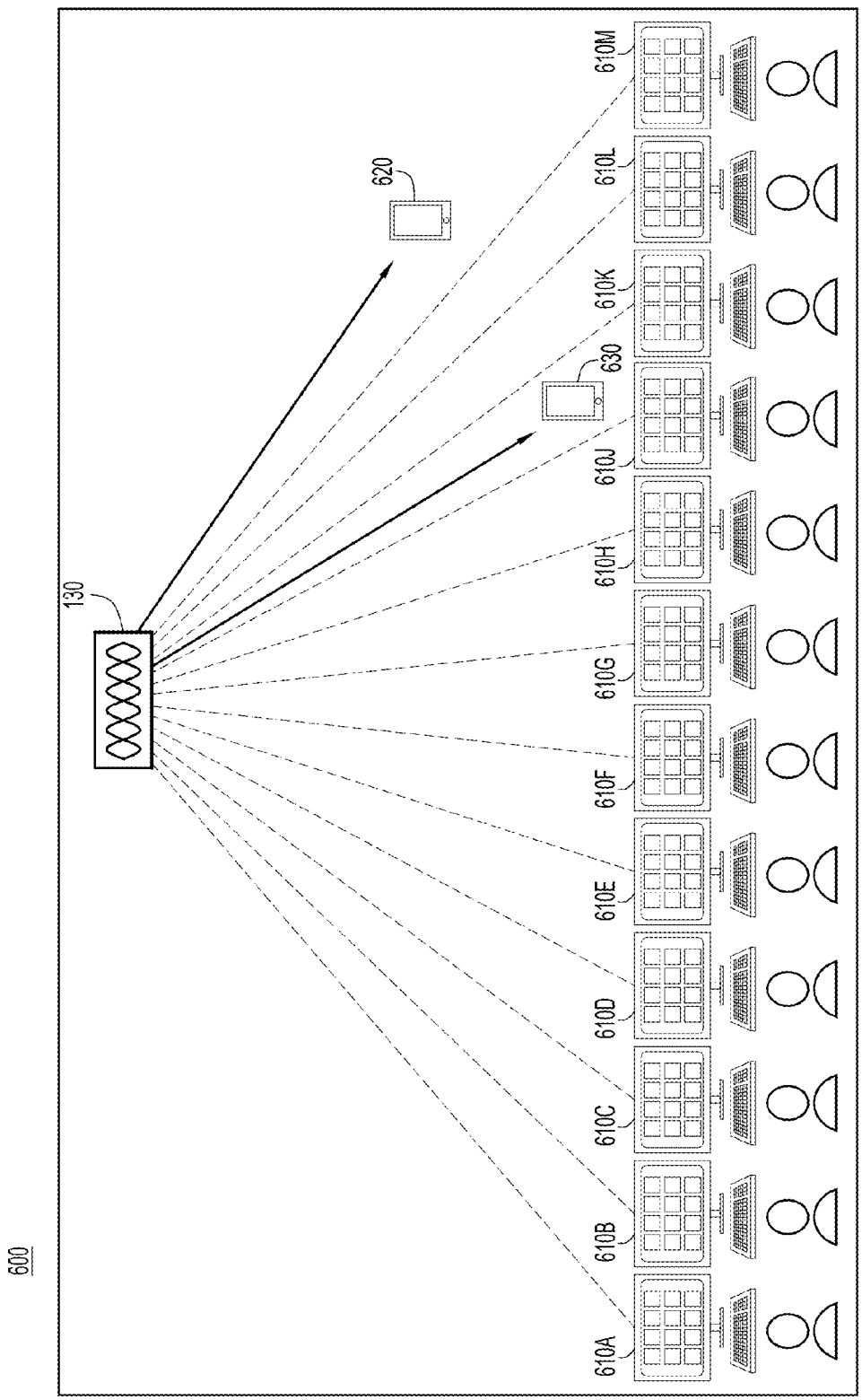
FIGS. 6 and 7 are simplified block diagrams of an access point controlling P2P wireless connections according to an example embodiment.

Referring now to FIG. 6, an example is shown of a system 600 that uses an access point to limit interfering P2P wireless connections in a dense user environment. In this example, users at user stations 610A-610M connect to the network infrastructure via access point 130. One user at user station 610M also has a personal device 620 that is configured to allow direct P2P connections. Similarly, the user at user station 610J has a personal device 630 that is configured to allow direct P2P connections. However, if the devices 620 and 630 are allowed to set up a direct P2P connection with each other (e.g., device 620 offers a service that device 630 accepts), then the infrastructure network connection for nearby user stations 610J, 601K, 610L, and 610M may encounter interference. Since the wireless P2P connection between device 620 and device 630 may share the same spectrum with the infrastructure connection for the user stations, the infrastructure connection may be degraded by the P2P connection. To preserve the infrastructure connection for all of the user stations, the access point 130 will control the direct P2P connections in the dense environment, and may cause the direct P2P connection to fail, as described above.

Figure 7:
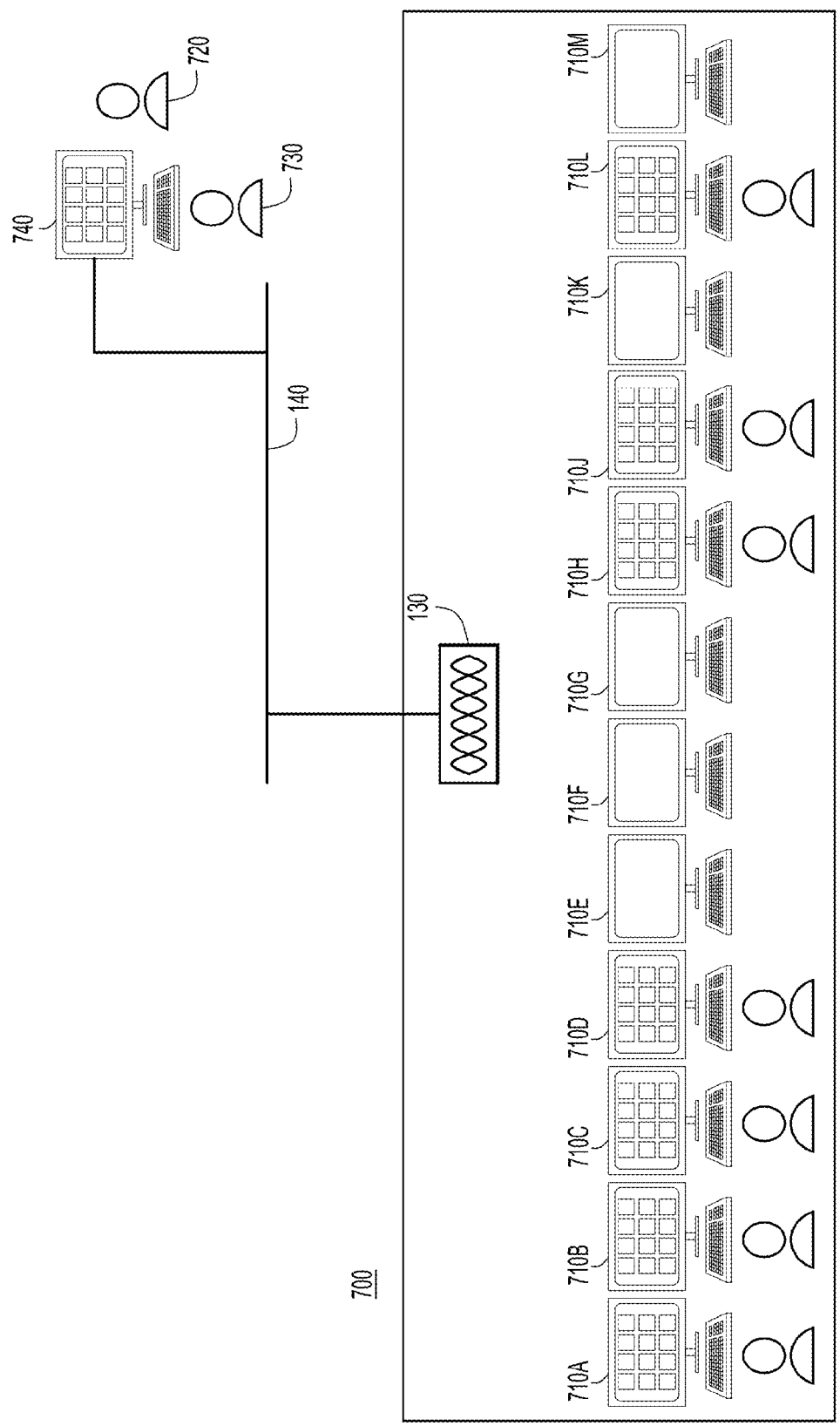

Referring now to FIG. 7, an example is shown of a system 700 that uses an access point to control P2P connections in user stations of a dense user environment. In one example, user stations 710A-710M may include a computer and peripherals (e.g., keyboard, mouse, monitor, etc.), with at least some of the peripherals communicating with the computer via direct P2P connections. In another example, a user may bring their own device (e.g., laptop computer) and connect to the peripherals via P2P wireless connections. Additionally, a user 720 may check with an administrator 730 when the user 720 would like to work at a user station. The administrator 730 assigns the user to an unoccupied user station (e.g., user station 710F). The administrator's computer 740 communicates through network 140 to the access point 130, and authorizes P2P connections between any device that the user 720 brought and the computer and/or peripherals in user station 710F.

In an uncontrolled environment, a user at user station 710A may inadvertently or deliberately connect their device to a nearby user station 710B. To avoid the confusion caused by a user at station 710A connecting to the wrong peripherals, the access point strictly controls any P2P connections of the peripherals in user station 710A to other peripherals and/or the computer in user station 710A. Additionally, the access point 130 may allow a direct P2P connection between the peripherals in user station 710A and a user device brought by a user that is authorized by the administrator 730 to work at user station 710A.

Figure 8A:
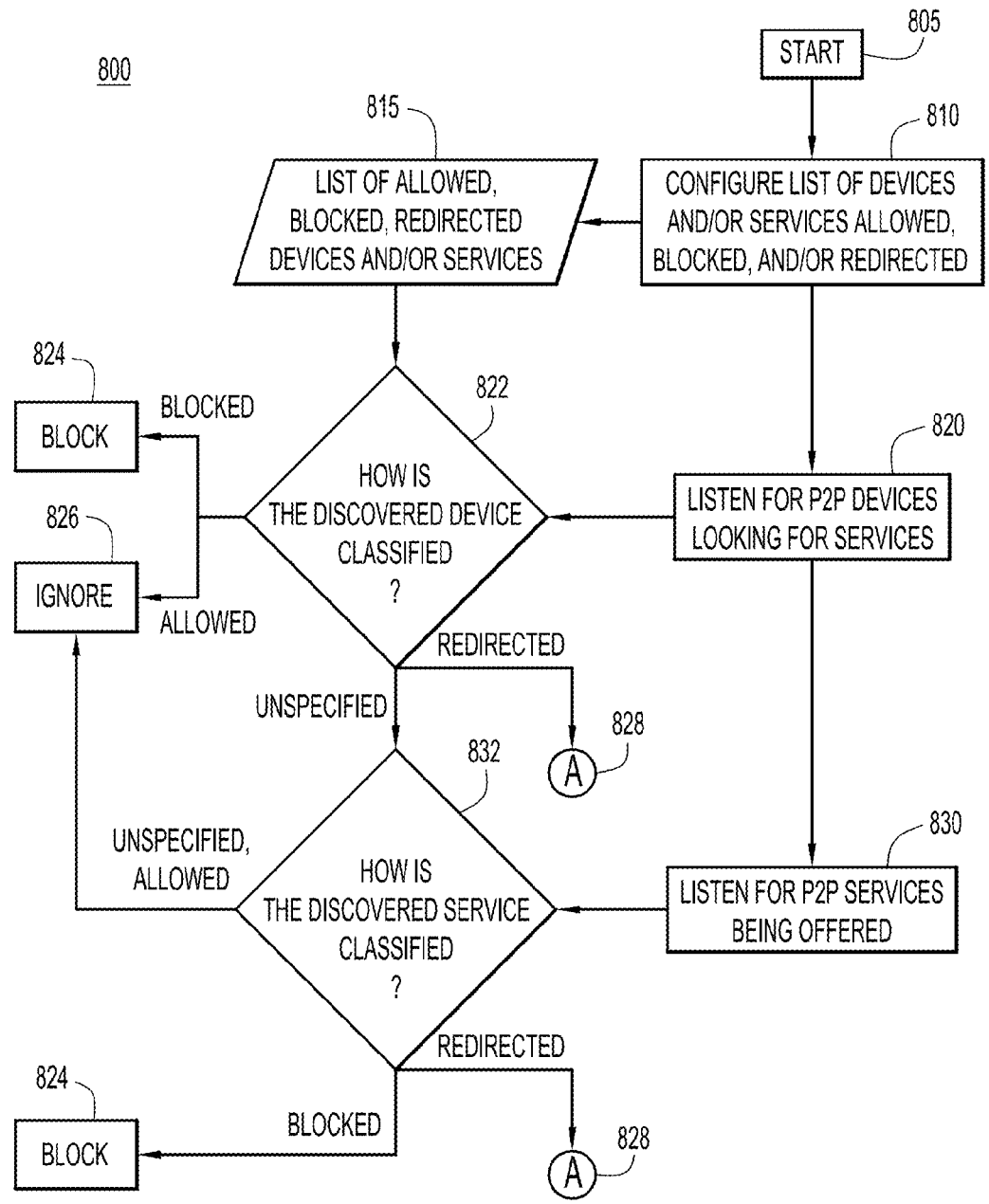
FIGS. 8A and 8B are flowcharts depicting operations of an access point in controlling and enhancing P2P services according to an example embodiment.
Figure 8B:
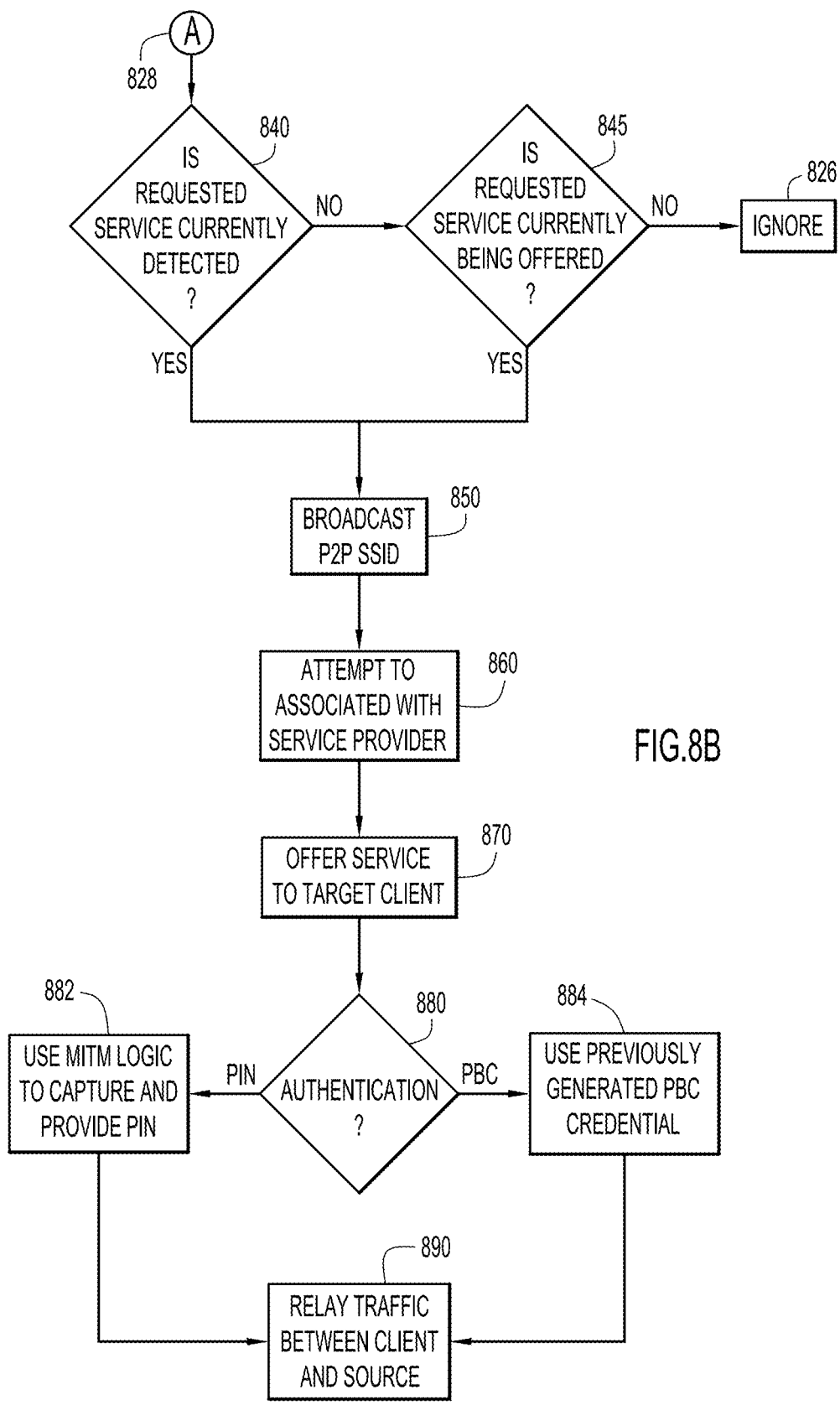

Referring now to FIGS. 8A and 8B, a process 800 is shown of an example of operations to control the wireless P2P connections in the range of an access point. From the start 805 of the process, an administrator may configure, in step 810, one or more lists 815 of devices and/or services that are allowed to make direct P2P wireless connections, should be prevented from making direct P2P wireless connections, or are designated to have their P2P wireless connections redirected through the network infrastructure. The system may also set up PBC authentication credentials in step 810 to allow the access point to act as a client for services that use PBC authentication.

The system listens to wireless frames (e.g., beacons, probe responses) containing P2P Information Elements (IEs) to identify devices. Any device found in step 820 is compared to the list of devices 815 to determine if/how the device is classified in step 822. If the device is categorized as a device that should be restricted from any P2P wireless connections, then the access point attempts to block the device in step 824. If the device is categorized as a device that is allowed to form P2P wireless connections, then the access point ignores the device in step 826, and allows the P2P wireless connection to proceed. If the device is categorized as a device that should have P2P wireless connections redirected through the network infrastructure, then the access points continues the process at point 828, further described below with respect to FIG. 8B. If the device is not categorized in any specific category, then the system does not take any specific action based on identifying the device, and proceeds to determine the service that the device may subscribe to. Alternatively, the system may attempt to block any device that is not categorized in any specific category.

The system also listens to the wireless frames containing a P2P IE to identify services that are being offered in step 830. Any service found in step 830 is compared to the list of services 815 to determine if/how the service is classified in step 832. If the service is categorized as a type of service that is prohibited, then the access point attempts to block P2P communications of devices using the service at step 824. If the service is either specifically allowed or not specifically categorized, then the access point ignores the service at step 826 and allows the service to be provided over a P2P wireless connection. Alternatively, services that are not specifically categorized may be restricted by default, and the system will attempt to block any service that is not categorized. If the service is categorized as a service that should be redirected through the network infrastructure, then the access point continues the process at point 828, further described below with respect to FIG. 8B.

Referring now to FIG. 8B, the process 800 continues in which either a device or a service has been detected that is categorized as a device or service that should be redirected through the network infrastructure. In step 840, the access point that is local to the device determines whether the service being requested is detected within range of that access point. If the service is not detected at the access point local to the device requesting the service, then the system determines, at step 845, whether the service is being advertised at any other access point that is connected to the local access point. If the service is not being offered at any accessible access point, then the system ignores the device at step 826, since the device is not able to establish a P2P connection since the service is unavailable.

If the service is detected, either at the access point local to the requesting device or at another access point connected to the local access point, then, in step 850, the local access point begins to broadcast the P2P Service Set Identifier (SSID) associated with the type of P2P wireless connection. In step 860, the access point that is local to the service providing device attempts to authenticate and associate with the service providing device, and determines which, if any, authentication mechanism is needed by the device offering the service. The access point offers the service to the device that is requesting the service in step 870. In one example, if the authentication method is Personal Identification Number (PIN) authentication, as determined in step 880, then the system uses Man in the Middle (MITM) logic to forward the request to the device and capture the PIN response from the device in step 882. In another example, if the authentication method is PBC authentication, as determined in step 880, then the system uses a previously generated PBC credential to authenticate the access point to the service providing device, while using a virtual PBC to create credentials for the device requesting the service. After the access point has successfully authenticated itself to both the service providing device and the service using device, the access point relays the P2P wireless connection traffic between the service providing device and the client on the service using device in step 890.

In one example, for services that should be forced through the wireless infrastructure, or offered by a device connected to a remote access point, the local access point would announce itself as a GO of a persistent group, according to the Wi-Fi Direct protocol. The local access point offers the service requested by the client device and previously reported as offered by another Wi-Fi Direct device. The access point may also use the invitation procedure to attract the Wi-Fi Direct client. This may be noted herein as a "dual citizenship" procedure, since the access point is both a client to the service providing device and a source to the service using device. Direct communication between the Wi-Fi Direct client and any other (non-access-point) Wi-Fi Direct device replying to the Wi-Fi Direct client may still be prevented, e.g., using one of the containment techniques described above. The access point would also join the Wi-Fi Direct device offering the service, as an emulated client device. In one example, the access point associating with service providing device may be different from the access point associated with the service using client device.

In another example, for devices offering PBC and offering a Wi-Fi Direct service that is selected to be redirected through the network infrastructure, the access point would attempt to make any direct P2P connections fail. This may be achieved by operating in several phases, as described below. In phase one, the infrastructure detects two P2P devices trying to pair. One device is the registrar and the other device is the enrollee. In phase two, the infrastructure prevents the enrollee from registering by attempting to block the P2P connection, as described above. In phase three, the access point registers as an enrollee to the device operating as the Wi-Fi Direct registrar. In phase 4, the access point announces itself as a Wi-Fi Direct GO for the service offered by the original registrar, and lets the original enrollee join. In another example, the access point may announce itself as a GO as soon as the enrollee device is detected.

In the above example, the access point would be a client to the original registrar, and the registrar for the original enrollee, thus obtaining a "dual citizenship" status. The access point would relay traffic between the original registrar and the original enrollee, and may route the traffic through a controller for QoS or security control, or to extend the range between the original enrollee and the original registrar.

In another example, PIN authentication may require a user to enter a PIN of the client device that requests access to the service. This PIN may be statically defined (e.g., for headless/screenless devices) or dynamically generated for each connection and each session. For P2P devices using PIN authentication, the access point may attempt to block the direct P2P connections, as described above, allowing the system to maintain containment of the P2P connections or manually registering the device. Manually registering the device may require the device PIN to be entered into a controller interface. A checkbox may be provided to allow an administrator to specify if the PIN is static or dynamic. The access point may enroll with a Wi-Fi Direct device requiring a PIN input from a peer by using a PIN generated by the access point. This enrollment may be done as part of a pre-staging phase, or at the time when a connection to the service using device is needed.

If the enrollment is performed during a pre-staging phase, i.e., no Wi-Fi Direct device is attempting to enroll directly to the Wi-Fi Direct device requiring PIN input, the access point may disconnect if the PIN is a static PIN. The PIN may be saved, and the AP may re-enroll whenever needed to re-acquire the "dual citizenship." For devices that use dynamic PINs, the access point would maintain the session so that a new PIN is not generated. The session may be maintained by sending a "keepalive" message, such as an Address Resolution Protocol (ARP) request to learn the registrar's IP address, followed by a periodic "ping" every 100 seconds. Alternatively, any other periodic message or timer value may be used to maintain the session with the same PIN. When a device tries to pair with the PIN device offering the service, the access point may attempt to block the direct P2P connection, as described above, and would then use a relay method similar to that of the PBC authentication method described above.

Figure 9:
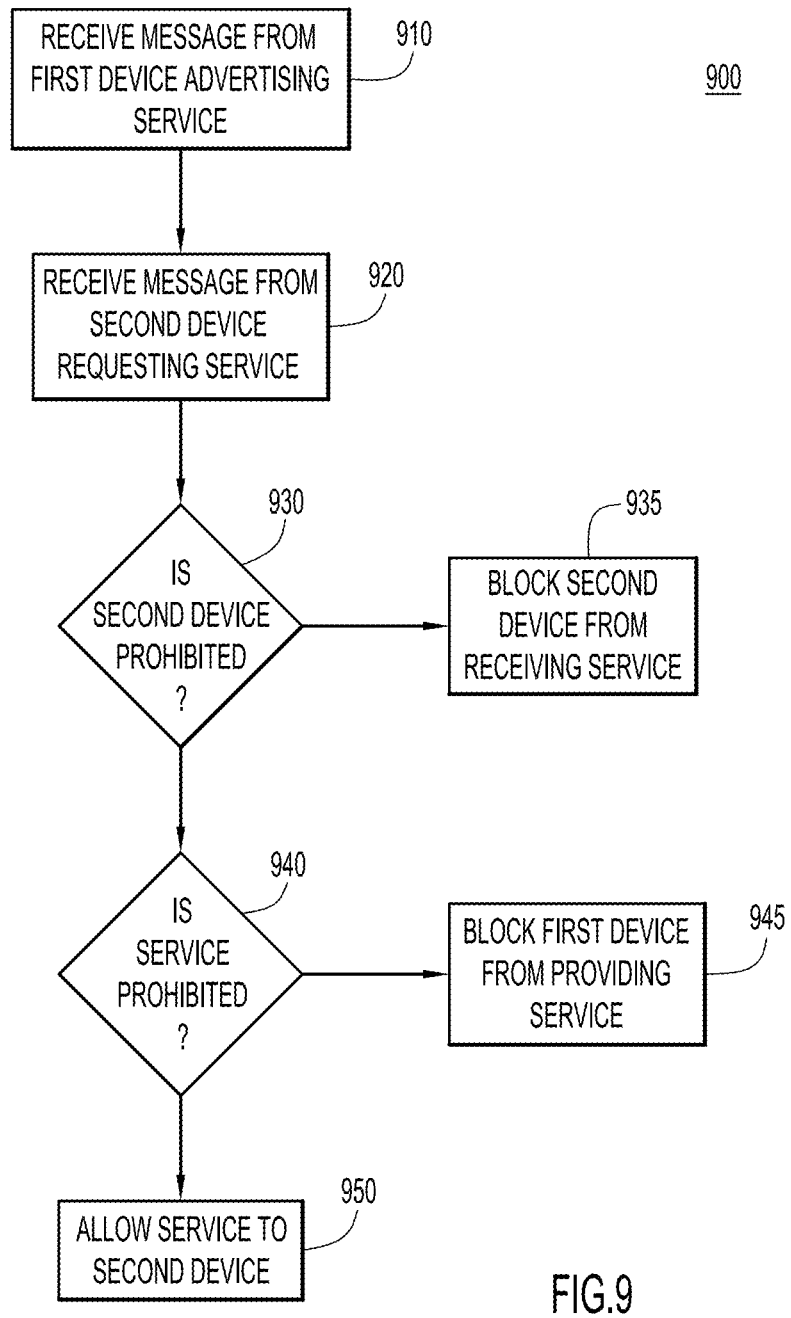
FIG. 9 is a flowchart depicting operations of an access point in blocking prohibited P2P connections according to an example embodiment.

Referring now to FIG. 9, a process 900 is described for an example of the operations of an access point in controlling P2P connections. In step 910, the access point receives a message from a first device advertising a service that the first device is able to provide. The access point also receives a message from a second device requesting the service in step 920. If the second device is prohibited from making P2P wireless connections, as determined in step 930, then the access point attempts to block the second device from receiving the service at step 935. If the service offered by the first device is prohibited, as determined in step 940, then the access point attempts to block the first device from providing the service over a P2P wireless connection. If neither the second device nor the service is prohibited, as determined in steps 930 and 940, respectively, then the access point allows the first device and the second device to set up a P2P connection in step 950, and the service is provided to the second device by the first device.

In summary, the techniques presented herein provide for blocking P2P wireless connections (e.g., Wi-Fi Direct) in controlled environments where P2P wireless connections may not be welcome. The techniques further provide for selectively allowing communication between P2P devices, based on the types of devices or the offered services. The P2P connection traffic may also be relayed through the wireless infrastructure, extending the range of the communication, and applying any security and/or QoS policies decided by a network administrator.

In one example, the techniques presented herein provide for a method for an access point to receive a first message from a first device advertising a service. The access point receives a second message from a second device requesting the service. The access point determines whether the second device or the service is prohibited in an area controlled by the access point. Responsive to a determination that the second device is prohibited, the access point blocks the second device from receiving the service. Responsive to a determination that the service is prohibited, the access point blocks the first device from providing the service.

In another example, an apparatus is provided comprising a network interface unit, a wireless transceiver, and a processor coupled to the network interface unit and the wireless transceiver. The network interface unit enables communications over a network. The wireless transceiver receives a first message from a first device advertising a service, and receives a second message from a second device requesting the service. The processor determines whether the second device or the service is prohibited in an area controlled by the apparatus. Responsive to a determination that the second device is prohibited, the processor blocks the second device from receiving the service. Responsive to a determination that the service is prohibited, the processor blocks the first device from providing the service.

In a further example, a system is provided comprising a first device, a second device, and an access point. The first device offers a service in a first wireless message. The second device requests the service in a second wireless message. The access point receives the first wireless message and the second wireless message, and determines whether the second device or the service is prohibited in an area controlled by the access point. Responsive to a determination that the second device is prohibited, the access points blocks the second device from receiving the service. Responsive to a determination that the service is prohibited, the access point blocks the first device from providing the service.

The above description is intended by way of example only. Various modifications and structural changes may be made therein without departing from the scope of the concepts described herein and within the scope and range of equivalents of the claims.

What is claimed is:
1. A method comprising:
receiving at an access point for a wireless network, a first message from a first device offering a peer-to-peer service to wireless devices near the first device, the first message including a source address of the first device;
receiving at the access point, a second message from a second device near the first device, the second message requesting the service;
determining whether the service is to be served by the access point;
responsive to a determination that the service is to be served by the access point, responding to the first device with a reply message subscribing to the service, and providing the service to the second device through the access point;
determining whether the second device or the service is prohibited in an area served by the access point;
responsive to a determination that the second device is prohibited, blocking the second device from the service by transmitting, to the second device, a spoofed source address of the first device and a first packet having a first setting that does not comply with a first wireless communication standard used by the first device and the second device so as to cause the second device to ignore the first message from the first device; and responsive to a determination that the service is prohibited, blocking the first device from providing the service by transmitting, to the first device, a spoofed source address of the second device and a second packet having a second setting that does not comply with a second wireless communication standard used by the first device and the second device so as to cause the first device to ignore the second message from the second device.

2. The method of claim 1, further comprising:
receiving from the first device, an authentication request for the service;
transmitting the authentication request to the second device;
receiving from the second device, an authentication reply that indicates an authorization for the service; and
transmitting the authentication reply to the first device.

3. The method of claim 2, wherein the authentication reply comprises at least one of a push-button control (PBC) credential, or a personal identification number (PIN).

4. The method of claim 1, wherein the first setting of the first packet is a supported rate frames capability field that only describes IEEE 802.11b rates, and the first wireless communication standard is Wi-Fi® Direct.

5. The method of claim 1, wherein the second setting of the second packet is a supported rate frames capability field that only describes IEEE 802.11b rates, and the second wireless communication standard is Wi-Fi® Direct.

6. An apparatus comprising:
a network interface unit to enable communications over a network;
a wireless transceiver to:
receive a first message from a first device offering a peer-to-peer service to wireless devices near the first device, the first message including a source address of the first device; and
receive a second message from a second device requesting the service; and
a processor coupled to the network interface unit and the wireless transceiver to:
determine whether the service is to be served by the apparatus; and
responsive to a determination that the service is to be served by the apparatus, cause the wireless transceiver to respond to the first device with a reply message subscribing to the service, and provide the service to the second device through the apparatus;
determine whether the second device or the service is prohibited in an area served by the apparatus;
responsive to a determination that the second device is prohibited, block the second device from the service by causing the wireless transceiver to transmit, to the second device, a spoofed source address of the first device and a first packet having a first setting that does not comply with a first wireless communication standard used by the first device and the second device so as to cause the second device to ignore the first message from the first device; and
responsive to a determination that the service is prohibited, block the first device from providing the service by causing the wireless transceiver to transmit to the first device, a spoofed source address of the second device and a second packet having a second setting that does not comply with a second wireless communication standard used by the first device and the second device so as to cause the first device to ignore the second message from the second device.

7. The apparatus of claim 6, wherein the wireless transceiver is further configured to:
receive from the first device, an authentication request for the service;
transmit the authentication request to the second device;
receive from the second device, an authentication reply that indicates an authorization for the service; and
transmit the authentication reply to the first device.

8. The apparatus of claim 7, wherein the authentication reply comprises at least one of a push-button control (PBC) credential, or a personal identification number (PIN).

9. The apparatus of claim 6, wherein the first setting of the first packet is a supported rate frames capability field that only describes IEEE 802.11b rates, and the first wireless communication standard is Wi-Fi® Direct.

10. The apparatus of claim 6, wherein the second setting of the second packet is a supported rate frames capability field that only describes IEEE 802.11b rates, and the second wireless communication standard is Wi-Fi® Direct.

11. A system comprising:
a first device offering a peer-to-peer service in a first wireless message that includes a source address of the first device;
a second device requesting the service in a second wireless message; and
an access point to:
receive the first wireless message and the second wireless message;
determine whether the service is to be served by the access point;
responsive to a determination that the service is to be served by the access point, respond to the first device with a reply message subscribing to the service, and provide the service to the second device through the apparatus;
determine whether the second device or the service is prohibited in an area controlled by the access point;
responsive to a determination that the second device is prohibited, block the second device from the service by transmitting, to the second device, a spoofed source address of the first device and a first packet having a first setting that does not comply with a first wireless communication standard used by the first device and the second device so as to cause the second device to ignore the first message from the first device; and
responsive to a determination that the service is prohibited, block the first device from providing the service by transmitting, to the first device, a spoofed source address of the second device and a second packet having a second setting that does not comply with a second wireless communication standard used by the first device and the second device so as to cause the first device to ignore the second message from the second device.

12. The system of claim 11, wherein the access point further:
receives from the first device, an authentication request for the service;
transmits the authentication request to the second device;

receives from the second device, an authentication reply that indicates an authorization for the service; and transmits the authentication reply to the first device.

13. The system of claim 12, wherein the authentication reply comprises at least one of a push-button control (PBC) credential, or a personal identification number (PIN).

14. The system of claim 11, wherein the first setting of the first packet is a supported rate frames capability field that only describes IEEE 802.11b rates, and the first wireless communication standard is Wi-Fi® Direct.

15. The system of claim 11, wherein the second setting of the second packet is a supported rate frames capability field that only describes IEEE 802.11b rates, and the second wireless communication standard is Wi-Fi® Direct.

* * * * *